Nov. 7, 1933.  A. Y. DODGE  1,934,527
SHAFT SUPPORT
Filed May 14, 1928
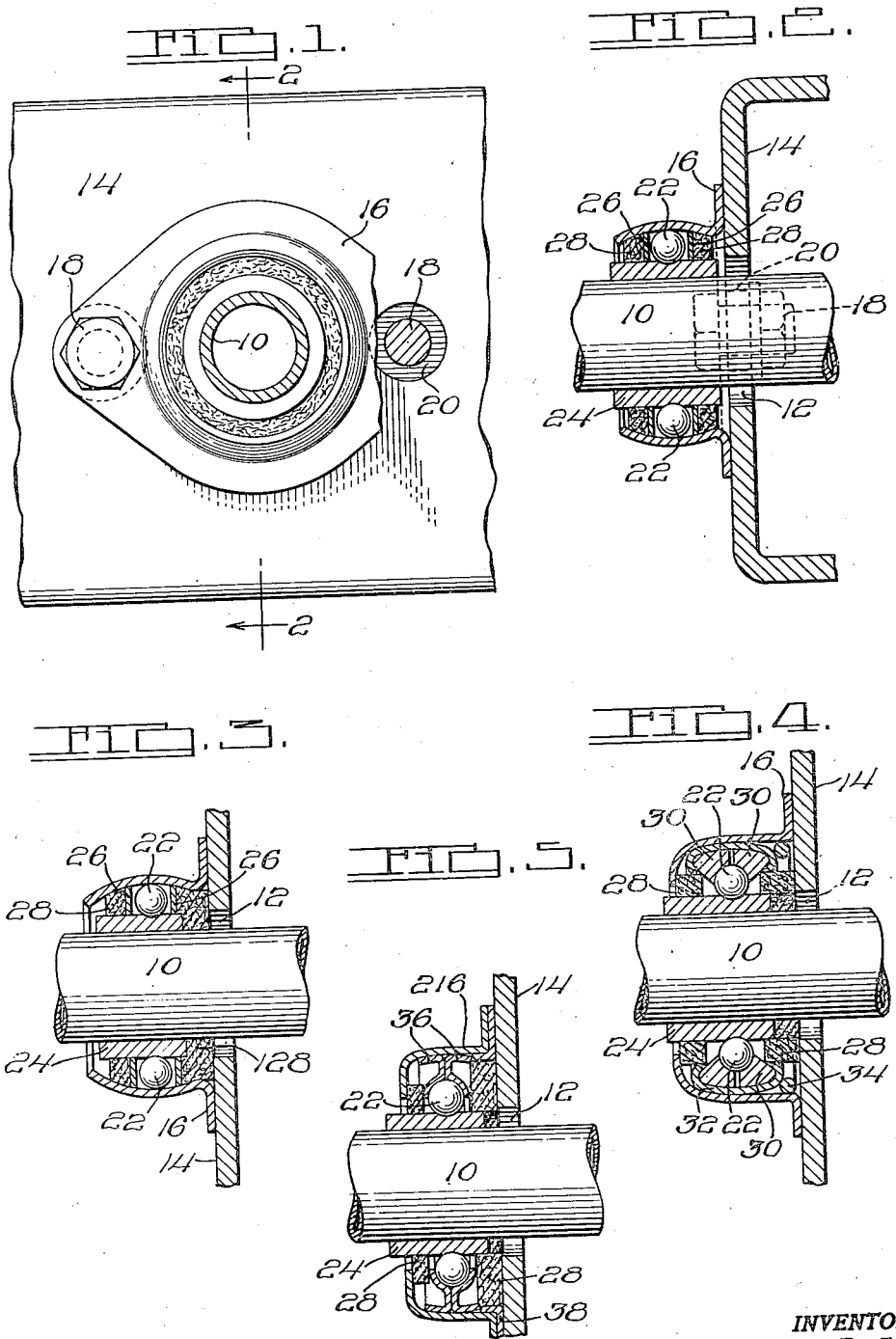
INVENTOR
Adiel Y. Dodge
BY
[signature]
ATTORNEY Patented Nov. 7, 1933

1,934,527

UNITED STATES PATENT OFFICE 1,934,527

SHAFT SUPPORT

Adiel Y. Dodge, South Bend, Ind., assignor to Bendix Brake Company, South Bend, Ind., a corporation of Illinois Application May 14, 1928. Serial No. 277,714

4 Claims. (Cl. 308—194)

This invention relates to shaft supports, and is illustrated as embodied in an anti-friction bearing for supporting a brake shaft on the chassis frame of an automobile. Various features of novelty relate to the arrangement of the parts to permit the use of simple stampings, and to give a universal mounting permitting the shaft to aline itself automatically with the bearing, and to other novel and desirable constructions which will be apparent from the following description of the illustrative embodiments shown in the accompanying drawing, in which:

Figure 1 is a section through a brake-operating shaft, showing the shaft support in end elevation;

Figure 2 is a section through the support on the line 2—2 of Figure 1; and

Figures 3, 4, and 5 are sections corresponding to Figure 2, but showing different modifications.

The illustrated supports are all intended to form bearings for a brake-operating shaft 10 extending freely through an opening 12 in a side member 14 of the chassis frame of an automobile. The illustrated shaft is in the form of a hollow tube.

The suport shown in Figures 1 and 2 includes a housing or bracket 16, preferably a drawn steel stamping, encircling the shaft and secured to member 14 by means such as bolts 18. If desired, bolts 18 may pass through relatively large holes 20 in member 14, so that the position of the support may be adjusted, after which bolts 18 are tightened to prevent shifting of the support.

The support 16 has an inner spherical surface, on which roll balls or rollers 22, arranged in a series about the shaft on a race or collar 24 pressed on the shaft. Preferably the opening 12 is slightly larger than race 24, to facilitate assembly. If it is desired to pack housing 16 with grease or other lubricant, washers 26 may be placed on opposite sides of balls 22, with felt retainers or washers 28 on their outer sides to retain the lubricant. It will be seen that the rolling of balls 22 on the spherical inner surface of housing 16 permits the shaft to shift slightly angularly without disturbing its alinement with respect to the support or bearing.

The arrangement of Figure 3 is like that described above, except that one felt washer 128 is directly sleeved on the shaft, and closes the opening 12.

In the arrangement of Figure 4, the balls 22 are carried by a race formed of two inner rings 30 embraced by an externally-spherical outer ring or stamping 32 having slidable engagement with the internal spherical surface of housing 116, and the support assembly is held together prior to bolting to the frame by means such as a snap ring 34. Rings 30 define between them an annular channel facing toward the shaft and embracing the balls 22.

In figure 5, the outer race is formed by two channel-section steel ring-shaped stampings 36, arranged base to base, and having externally-spherical outer flanges slidably engaging the internally-spherical housing 216, and also having inner curved flanges defining an annular channel facing toward the shaft and embracing the balls 22. A ring-shaped L-section stamping 38 serves as a retainer for the right felt washer 28.

While several illustrative embodiments have been described in detail, it is not my intention to limit the scope of the invention to those particular embodiments, or otherwise than by the terms of the appended claims.

I claim:

1. A shaft support comprising, in combination with a shaft a supporting housing encircling the shaft and formed with an internal spherical surface, a ball race within the housing having an external spherical surface slidably engaging the spherical surface of the housing, and a series of anti-friction balls arranged about the shaft between said race and the shaft, said race being formed of two channel-section stampings arranged base to base with outer spherical flanges engaging the housing and with inner curved flanges embracing said balls.

2. A shaft support comprising, in combination with a shaft, a supporting housing encircling the shaft, a ball race also encircling the shaft and formed of two channel-section stampings arranged base to base with outer flanges engaging the inside of said housing and with inner curved flanges defining an annular channel facing toward the shaft, and a series of balls in said annular channel arranged about the shaft and rotatably supporting the shaft.

3. A shaft support comprising, in combination with a shaft, a suppporting housing encircling the shaft and formed with an internal spherical surface, an outer ring within the housing and also encircling the shaft and which has a spherical outer surface engaging the spherical surface of the housing, a pair of cooperating inner rings embraced by the outer ring and defining between them an annular channel facing toward the shaft, and a series of balls in said annular channel arranged about the shaft and rotatably supporting the shaft.

4. A device of the character described comprising, in combination with a shaft, a support encircling the shaft and formed with an internal spherical surface, a series of anti-friction balls interposed between the support and the shaft, and retaining washers positioned within the support and contacting with the balls.

ADIEL Y. DODGE.